3,206,410
WATER-IN-OIL EMULSIONS
Frederik André Möller, Haren, and Cornelis Martinus Hendrik Kool and Harmannus Kliphuis, Hoogezand, Netherlands, assignors to W. A. Scholten's Chemische Fabrieken N.V., Groningen, Netherlands, a corporation of the Netherlands
No Drawing. Filed July 11, 1961, Ser. No. 146,026
Claims priority, application Netherlands, June 12, 1957, 218,048
5 Claims. (Cl. 252—309)

This invention relates to emulsions, and it relates particularly to water-in-oil emulsions of high stability.

This application is a continuation-in-part of our copending application Serial No. 741,234, filed June 11, 1958, now abandoned.

Water-in-oil emulsions have heretofore been prepared using various types of emulsifiers, such as polyvalent metal salts of higher fatty acids, esters of polyhydric alcohols and fatty acids, or oxidized fatty oils. These conventional emulsifiers, however, are sensitive to acids, salts or alkali, which leads to lack of stability of emulsions prepared with these emulsifiers, when the above chemicals are present.

It is an object of this invention to provide water-in-oil emulsions which are exceptionally stable, even in the presence of acids, salts and alkali. This object is attained by using novel emulsifiers which are condensation products of polyepoxides and higher alcohols. More particularly, the novel emulsifiers according to our invention consist essentially of the reaction products of 1 mole of a monohydric higher aliphatic alcohol having at least 12 carbon atoms and about 0.4–2.0 moles of a polyepoxide having a molecular weight of at most about 400, which polyepoxide is a diepoxysubstituted hydrocarbon, or a glycidyl polyether of a polyhydric alcohol or a glycidyl polyether of a polyhydric phenol. Emulsions according to the invention are prepared by mixing from about 0.025 to 10 parts by weight of the aforesaid emulsifier with from about 20 to 85 parts by weight of an oil as the continuous phase and from about 15 to 80 parts by weight of water as the dispersed phase.

Other emulsifiers according to our invention consist essentially of the reaction products of one mole of a diterpenoid resin alcohol i.e. alcohols derived from colophonium and the like rosins, such as, especially hydroabietylalcohol, with from about 0.4 to 2.0 moles of the abovedescribed polyepoxides of a molecular weight of at most 400.

Emulsions are prepared with the same amounts of this type of emulsifier according to the invention and with the same ranges of proportions of oil and water as described above.

Polyepoxides which are suitable for the preparation of the emulsifier are diepoxysubstituted aliphatic and alicyclic (cycloaliphatic) hydrocarbons, such as butadiene dioxide, vinylcyclohexene dioxide, dipentene dioxide, dicyclopentadiene dioxide and bis-(methyl cyclohexenyl)-dioxide. These diepoxides all have a molecular weight lower than 400. Other polyepoxides that may be used are glycidyl polyethers obtained by the reaction of epichlorohydrin with a polyhydric alcohol, followed by dehydrohalogenation according to U.S. Patent 2,752,269; suitable polyhydric alcohols are alkylene diols such as ethylene glycol, propylene glycol, diethylene glycol, 2,3-butanediol, furthermore glycerol and erythritol. Further suitable polyepoxides are obtained by the reaction of epichlorohydrin and polyhydric phenols, such as resorcinol, hydroquinone, pyrocatechol, phloroglucinol and novolac resins.

These glycidyl polyethers should have an average molecular weight not higher than about 400. Commercial types of such polyepoxides are Eponite 100, Eponite 562 (=Epikote 812) and Epikote 828, all marketed by Shell Chemical Corporation.

The polyepoxides are reacted with monohydric alcohols having at least 12 carbon atoms. These alcohols are the higher aliphatic alcohols, including saturated and unsaturated alcohols, such as lauryl, myristyl, cetyl, stearyl, arachidyl, behenyl, hydroxy-stearyl, oleyl, elaidyl, linoleyl and linolenyl alcohols or the diterpenoid resin alcohols such as hydroabietylalcohol. We have further used mixtures of these alcohols since most of them are usually commercially available in the form of mixtures containing two or more of them. The reaction products of polyepoxides and higher alcohols are obtained by heating them from about 0.4 to above 2.0 moles of a polyepoxide and 1 mole of the alcohol in the presence of small amounts of a catalyst at temperatures, depending on the nature of the reactants, in the range of about 40 to 250° C., until the reaction mixture grows viscous, being short of gelatinization and pulls threads when a stirring rod is dipped into a cooled sample and withdrawn therefrom.

Suitable catalysts for this reaction are acid-type catalysts, such as boron-trifluoride complexes (Plesch, "Cationic Polymerization and Related Complexes," Academic Press, N.Y. (1953), concentrated sulfuric acid, aluminium trichloride (anhydrous or in organic solutions), zinc chloride, zinc fluoborate $(Zn(BF_4)_2)$, anhydrous ferric chloride, stannic chloride or concentrated ortho-phosphoric acid.

Vegetable oils as well as mineral oils may be used as the continuous phase of the emulsion. Such oils are, for instance cottonseed oil, corn oil, groundnut oil, kerosene, diesel oil and lubricating oil.

Also applicable are other organic non-water-soluble solvents, provided that the emulsifier is at least soluble or dispersible in these solvents to some extent. Such solvents are, particularly white spirit, aromatic hydrocarbons, such as benzene, toluene and xylene and chlorinated solvents, such as trichloroethylene and perchloroethylene.

The emulsion may be prepared by any conventional method for the manufacture of water-in-oil emulsions, such as by adding water, an aqueous solution or an aqueous dispersion to the solution or dispersion of the emulsifying agent in the continuous phase and processing the mixture by means of the known emulsifying or homogenizing machines into the desired emulsion.

The emulsions according to the invention are stable at ordinary temperatures and they are also resistant to the influence of chemical additions, particularly of alkaline substances. Usually the emulsions are also stable at higher temperatures, such as up to 100° C. The thermostability of the emulsions may be easily established by the so called "Steam Emulsion Test", which is described in detail under No. D157–36 in A.S.T.M. Standards (1946), Part III–A, page 174. In this test steam is led into a solution of the emulsifying agent in a mineral or vegetable oil, whereupon a water-in-oil emulsion is formed. The stability is then observed by keeping the emulsions in graduated glass cylinders in a waterbath at a temperature of 93–95° C. and noticing the amount of one of the phases that separates off within an arbitrary time.

The emulsions according to the invention are applicable in widely varying fields of the art e.g. as polishing emulsions, lubricating emulsions, textile printing emulsions, drilling mud emulsions, anticorrosion emulsions, battery emulsions, emulsion inks and so called dry cleaning emulsions.

The invention is further illustrated but not limited by the following examples. In the examples all parts are given by weight.

*Example 1*

5 parts of the emulsifier described hereinafter are dissolved at 60° C. in 100 parts of a SAE 30 lubricating oil. In a laboratory emulsifying machine 20 parts of water containing approximately 0.025 part of calcium hydroxide are gradually added to this solution, whereby a homogeneous water-in-oil emulsion is formed. This emulsion may be stored for a long time at a high temperature without changing. The emulsion is very suitable as a lubricant having anticorrosive properties.

The emulsifier was prepared in the following manner:

To a mixture of 114 parts of fatty alcohol obtained by reduction of castor oil fatty acid and 4.5 parts of a 4.5% etherical $BF_3$ solution 101 parts of epoxy octadecane were added at room temperature while stirring. An exothermic reaction occurred. Thereupon the reaction mixture was heated for 2 hours at a temperature of 75–80° C. Subsequently another 4.5 parts of $BF_3$ solution and 45 parts of butadiene dioxide were added and heated for 1½ hours at a temperature of 60° C. while stirring.

A viscous light coloured transparent mass was formed which was properly soluble in oil. Upon subjecting 20 cc. of a 1% solution of the ether thus obtained in mineral oil having an SAE viscosity 30 to the Steam Emulsion Test, only 1 cc. of oil is separated off after the mixture had been allowed to stand for 20 minutes at a temperature of 93–95° C.

*Example 2*

Example 1 is repeated using 5 parts of an emulsifier which was prepared in the following manner:

A mixture of 27 parts of elaidylalcohol, 8.6 parts of butadiene dioxide and 1 part of concentrated $H_2SO_4$ was heated for 2½ hours at a temperature of 70° C. while stirring. The stringy product thus obtained gave a satisfactory Steam Emulsion Test. The W/O-emulsion containing calcium hydroxide obtained with this emulsifier exhibits a very good stability.

*Example 3*

Very suitable emulsions are likewise obtained if Example 1 is repeated using 2 parts of an emulsifier which was prepared in the following manner:

To a mixture of 268 parts of elaidylalcohol and 1.35 parts of a 45% $BF_3$-acetic acid catalyst, 300 parts of Epikote 812 were gradually added, while heating the mixture to 75–80° C. until a viscous, stringy condensation product was obtained. Epikote 812, a polyglycidylether of glycerol, marketed by Shell Chemical Corporation, has a molecular weight of about 300 and contains about 2 epoxy groups per molecule. When this emulsifier was subjected to the Steam Emulsion Test it gave emulsions which are excellently stable at a temperature of 93–95° C.

*Example 4*

In 160 parts of gas oil 2 parts of petroleum sulphonate and 5 parts of the emulsifier to be described hereinafter are dissolved, whereupon 50 parts of barium sulphate are suspended in this solution.

Subsequently 133 parts of an alkaline clay suspension (pH=12) are added to this suspension in a laboratory emulsifying machine. In the preparation of the clay suspension 8 parts of Zeogel, a special clay of the Baroid Sales Division of the National Lead Company (U.S.A.), were used. The resulting water-in-oil emulsion is very suitable as a drilling mud emulsion for drilling oil wells and it has the advantage that it is resistant at high temperatures.

The emulsifier used was obtained in the following manner:

A mixture of 536 parts of elaidyl alcohol, 370 parts of epichlorohydrin and 5 parts of concentrated sulphuric acid was brought to a temperature of 160° C. in the course of 5 hours and subsequently kept at this temperature for another two hours. The reaction mixture was cooled to a temperature of 70–80° C., whereupon in the course of one hour 200 parts of NaOH of 95% were added in small amounts. The temperature was then maintained at about 80° C. for 2½ hours. Subsequently the mixture was neutralized with diluted acetic acid, washed with water and the resulting ether was separated from the water layer.

When stored at a temperature of 93–95° C. 20 cc. of a 1% solution of the final product in mineral oil of SAE viscosity 50 in 20 minutes only separates off 1 cc. of oil with the application of the Steam Emulsion Test.

*Example 5*

Example 4 is repeated using 5 parts of an emulsifier which was prepared in the following manner:

A mixture of 268 parts of oleylalcohol and 0.7 part of a 45% $BF_3$-acetic acid catalyst was heated to a temperature of 50° C. Over a period of 3 hours 240 parts of Epikote 812 were gradually added to this mixture. In this way a viscous, stringy reactionproduct was obtained, which gave when applied in the composition of Example 4 a stable drilling mud emulsion.

*Example 6*

Very good drilling mud emulsions are likewise obtained when Example 4 is repeated using an emulsifier which was prepared in the following manner:

To a mixture of 200 parts of Abitol, a technical hydroabietylalcohol marketed by Hercules Powder Company and 2 parts of 45% $BF_3$-acetic acid catalyst, 180 parts of vinylcyclohexene dioxide were gradually added, while heating to approximately 70° C. When the mixture has grown stringy to such a degree that it pulls threads when a stirring rod is dipped into a cooled sample and withdrawn therefrom, the heating was discontinued. The reaction product showed good emulsifying properties, not only at room temperature, but also at a temperature of 93–95° C. at which temperature the Steam Emulsion Test was performed.

*Example 7*

7.5 parts of the emulsifier described in Example 4 are dissolved at 70° C. in 180 parts of lubricating oil by heating to a temperature of 70° C. By means of a laboratory emulsifying machine a solution of 6.4 parts of lithium hydroxide in 68 parts of water is emulsified in this oil phase. The emulsion obtained is thermostable. At room temperature the emulsion may be kept for a very long time. An important application of this emulsion of the water-in-oil type is as a lubricant for the cylinders of internal combustion engines, more particularly in places where corrosive combustion products of an acid nature are formed.

*Example 8*

An emulsifier was prepared in the following manner:

92 parts of vinylcyclohexene dioxide were gradually added to a mixture of 50 parts of stearylalcohol, 50 parts palmityl alcohol and 0.5 part of $BF_3$-acetic acid catalyst at a temperature of 70° C., whereby a viscous, stringy reaction product was obtained.

This reaction product is applied as emulsifier in the formula of Example 7. The water-in-oil emulsion thus obtained shows satisfactory stability, even after prolonged storage.

Example 9

Example is repeated using 4 parts of an emulsifier which was prepared in the following manner:

A mixture of 300 parts of Adol 67, 250 parts of Epikote 812 and 0.2 part of $BF_3$-acetic acid catalyst (45%) were heated, while being stirred, to a temperature of 70° C. Adol 67 is a commercial mixture marked by Archer-Daniels-Midland Company consisting of myristyl-, cetyl-, stearyl-, arachidyl- and behenylalcohol. The resulting viscous product gives a satisfactory Steam Emulsion Test.

The resulting water-in-oil emulsion containing LiOH in the water phase may be stored for a prolonged time and is very suitable as a lubricant having anti-corrosive properties.

Example 10

Of the emulsifier described hereinafter 12 parts are dissolved at 50–60° C. in 32 parts of white spirit. Subsequently 6 parts of the vat dye Indanthrenbrillantgrün G.G. Suprafix of Badische Anilin und Soda Fabriken were suspended in this solution. In 102 parts of water 24 parts of potassium carbonate and 24 parts of sodium sulphoxylate are dissolved. Subsequently the water phase is emulsified in the oil phase in a laboratory emulsification machine. With the resulting stable water-in-oil emulsion printing tests are run on cotton fabric by means of the roll printing technique. The fabrics are dried, steamed, rinsed, washed and dried. The resulting prints are very sharp and of a good evenness and the fabric has a supple feel.

The emulsifier was prepared in the following manner: 195 parts of Epikote 828 and 270 parts of oleylalcohol were heated to 100° C. and 4 parts concentrated $H_2SO_4$ were added. Epikote 828, a product of Shell Chemical Corporation, is a polyglycidylether of diphenylolpropane, containing about 2 epoxy groups per molecule (molecular weight about 400).

The temperature was gradually raised to 200° C. After the mixture had been kept at this temperature for about 15 minutes the heating was stopped and the viscous mixture was cooled.

The resulting product was dispersible in paraffin oil. When 20 cc. of a 1% dispersion in this oil was subjected to the Steam Emulsion Test, only 1 cc. of oil separated off after 20 minutes at 93–95° C.

Example 11

Very good results are likewise obtained when Example 10 is repeated but when instead of the reaction product of Epikote 828 and oleylalcohol, a condensation product of Eponite 100 (a polyepoxide having a molecular weight below 400, marketed by Shell Chemical Corporation) and oleylalcohol is used as emulsifying agent.

Example 12

Emulsions are made using 1.5 parts of the emulsifier described in Example 5 and using the following parts of arachide oil and water respectively

| Arachide oil | Water |
|---|---|
| 20 | 80 |
| 35 | 65 |
| 50 | 50 |
| 65 | 35 |
| 75 | 25 |
| 85 | 15 |

In each case an emulsion is obtained which shows satisfactory stability even at a temperature of 93–95% C.

We claim:
1. An emulsion consisting essentially of
   (I) from about 0.025 to 10 parts by weight of an emulsifier formed by the reaction of 1 mole of a monohydric aliphatic alcohol, having at least 12 carbon atoms, with about 0.4 to 2.0 moles of a polyepoxide having a molecular weight of at most about 400 and being selected from the group consisting of butadiene dioxide, vinylcyclohexenedioxide glycidyl polyethers of glycerol and glycidyl polyethers of diphenylolpropane,
   these compounds being heated together at a temperature in the range of from 40 to 250° C. in the presence of an acid-type catalyst,
   (II) between about 20 and 85 parts by weight of an oil as the continuous phase, and
   (III) between about 15 and 80 parts by water as the disperse phase.
2. An emulsion consisting essentially of
   (I) from about 0.025 to 10 parts by weight of an emulsifier formed by the reaction of 1 mole of hydroabietylalcohol with about 0.4 to 2.0 moles of a polyepoxide having a molecular weight of at most about 400 and being selected from the group consisting of butadiene dioxide, vinylcyclohexenedioxide, glycidyl polyethers of glycerol, and glycidyl polyethers of diphenylolpropane,
   these compounds being heated together at a temperature in the range of from about 40 to 250° C. in the presence of an acid-type catalyst,
   (II) between about 20 and 85 parts by weight of an oil as the continuous phase, and
   (III) between about 15 and 80 parts by water as the disperse phase.
3. An emulsion consisting essentially of
   (I) from about 0.025 to 10 parts by weight of an emulsifier formed by the reaction of 1 mole of a monohydric aliphatic alcohol having at least 12 carbon atoms with about 0.4 to 2.0 moles of a glycidyl polyether of glycerol containing about two epoxy groups per molecule and having a molecular weight of about 300, these compounds being heated together at a temperature in the range of from about 40 to 250° C. in the presence of an acid-type catalyst,
   (II) between about 20 and 85 parts by weight of an oil as the continuous phase, and
   (III) between about 15 and 80 parts by water as the disperse phase.
4. An emulsion consisting essentially of
   (I) from about 0.025 to 10 parts by weight of an emulsifier formed by the reaction of 1 mole of a monohydric aliphatic alcohol having at least 12 carbon atoms with about 0.4 to 2.0 moles of a glycidyl polyether of diphenylolpropane containing about two epoxy groups per molecule and having a molecular weight of about 400, these compounds being heated together at a temperature in the range of from about 40 to 250° in the presence of an acid-type catalyst,
   (II) between about 20 and 85 parts by weight of an oil as the continuous phase, and
   (III) between about 15 and 80 parts by water as the disperse phase.
5. An emulsion consisting essentially of
   (I) from about 0.025 to 10 parts by weight of an emulsifier formed by the reaction of 1 mole of a diterpenoid resin alcohol with about 0.4 to 2.0 moles of a polyepoxide having a molecular weight of at most about 400 and being selected from the group consisting of butadiene dioxide, vinylcyclohexenedioxide glycidyl polyethers of glycerol, and glycidyl polyethers of diphenylolpropane,
   these compounds being heated together at a temperature in the range of from about 40 to 250° C. in the presence of an acid-type catalyst,

(II) between about 20 and 85 parts by weight of an oil as the continuous phase, and
(III) between about 15 and 80 parts by water as the disperse phase.

References Cited by the Examiner

UNITED STATES PATENTS

| | | | |
|---|---|---|---|
| 1,970,578 | 8/34 | Schoeller, et al | 260—458 |
| 2,144,808 | 1/39 | Parker | 252—309 XR |
| 2,700,030 | 1/55 | Widmer et al. | 260—47 |
| 2,724,694 | 11/55 | Froianello | 252—49.5 |
| 2,829,072 | 4/58 | Thomas | 260—2 |
| 2,888,489 | 5/59 | Horsley et al. | 252—351 |
| 2,935,488 | 5/60 | Phillips et al. | 260—47 |

FOREIGN PATENTS

| | | |
|---|---|---|
| 536,356 | 1/57 | Canada. |
| 586,026 | 10/59 | Canada. |

JULIUS GREENWALD, *Primary Examiner.*